Dec. 17, 1940.  H. HIRTH  2,225,451
CRANKSHAFT
Filed Nov. 26, 1937
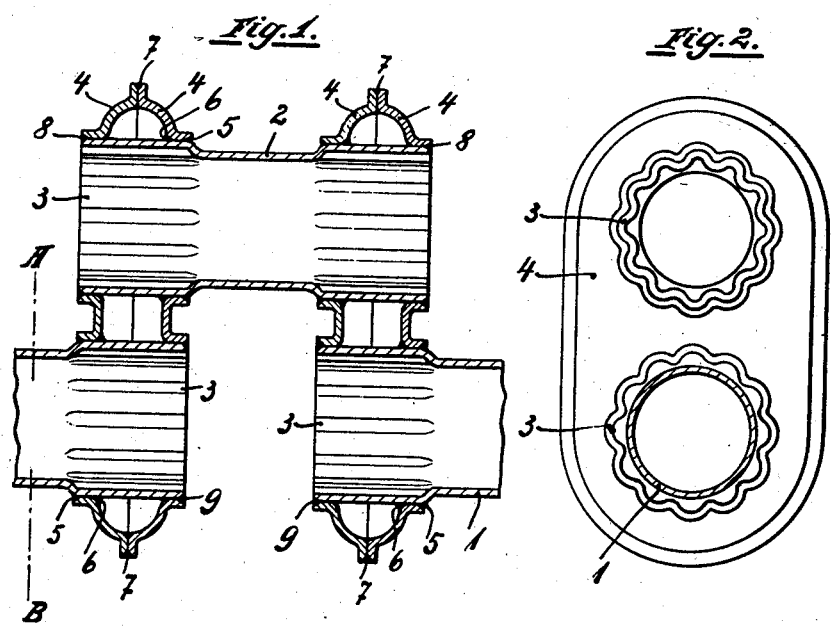
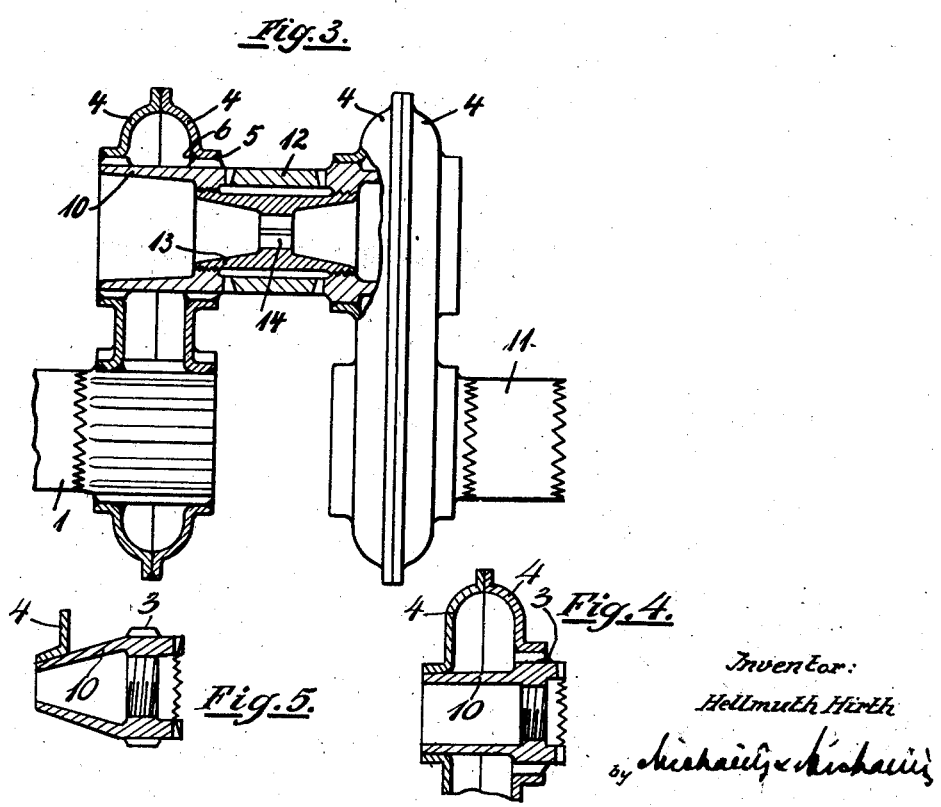
Inventor:
Hellmuth Hirth Patented Dec. 17, 1940

2,225,451

UNITED STATES PATENT OFFICE 2,225,451

CRANKSHAFT

Hellmuth Hirth, Stuttgart, Germany, assignor to Hirth-Motoren G. m. b. H., Stuttgart-Zuffenhausen, Germany Application November 26, 1937, Serial No. 176,612
In Germany November 30, 1936

1 Claim. (Cl. 74—598)

My invention relates to crankshafts. It is an object of the invention to provide crankshafts, which are lighter in weight and stronger and can be manufactured in a more economical manner than other crankshafts hitherto designed.

As a rule crankshafts are made from forged blanks, and in the case of quantity production, from swaged blanks. Machining is effected by means of cutting tools. A great deal of power and time is spent on the cutting down of a considerable part of the valuable material to valueless cuttings. The shape given to the individual parts of the shaft is frequently determined more by considerations of machining rather than by considerations of the most favorable stressing in operation, and the parts are besides made too heavy, which likewise amounts to a waste of material. Crankshafts are exposed mainly to bending and torsional forces, and it is a well known fact that the outermost fibres of the material contribute mostly to the transmission of these forces, the fibres in the interior of the shaft being far less efficaceous and being therefore utilized only partly. This is the reason why parts of shafts are mostly made hollow, for instance by boring, which once more amounts to a wasting of valuable material.

I avoid this waste and utilize the material best suited for this purpose in the most economical manner, at the same time keeping the weight of the crankshaft particularly low by forming the shaft and more especially the cranks as hollow bodies, the walls of which consist of pieces of material of substantially the thickness corresponding to the wall thickness of the finished hollow body. I prefer making the shafts and more especially the cranks from sheet metal pressed into shape to form hollow shells of the shape required. With equal weight and material sheet metal always possesses a higher mechanical strength than a body of higher wall thickness, and this in view of the particular manner in which it has been produced, since the rolling process leads to a more intense kneading and to a greater compression of the material. Defects in the material can be traced and avoided or excluded more readily.

Manufacture of the parts of the shaft from sheet metal is effected without cutting and therefore without any loss of material by mere pressing and drawing. The single parts of the sheet metal shaft are preferably connected with each other by welding, and the hollow shafts thus obtained are then treated further in the same manner as solid forged blanks.

The modern welding processes render it possible to effect all such connections quickly and in an absolutely safe manner. Welding seams, if carefully produced, possess a mechanical strength running up to 60 kg./mm$^2$. However, since these seams are not particularly fit for transmitting torsional or rotatory forces, I may provide special means for transmitting such forces, whereby the welding seams are relieved.

In the drawing affixed to this specification and forming part thereof crankshafts embodying my invention are illustrated diagrammatically by way of example.

In the drawing,

Fig. 1 is an axial section, and

Fig. 2 a cross section on the line A—B in Fig. 1, of the first modification.

Fig. 3 is an axial section, partly in elevation, of a second modification.

Figs. 4 and 5 are axial sections of a crank pin and a crank, and of a bearing journal respectively.

Referring to the drawing and first to Figs. 1 and 2, the shaft proper 1 and the crank pins 2 may be formed from sheet metal strips by rolling, the longitudinal seam being closed by welding. Alternatively I may use drawn steel tubes in the manufacture of these parts. In order to obtain a favorable transmission of the rotatory forces, I form the welding ends of the cylindrical pins with embossed portions 3 which project into corresponding depressions of the cranks and serve to carry them along. Preferably these embossed portions may have the form of corrugations. I thereby at the same time obtain a considerable lengthening of the welding seam and a larger surface for the connecting of the parts.

Each crank is here composed of two halves 4 formed with perforations into which project the pins 1 and 2. The edges of the perforations are beaded to form annular flanges and are corrugated in such manner that the pins fit tightly into them.

When assembling a shaft such as here shown, the corrugated end of the pin or shaft 1 is first introduced into one of the hollow cranks 4 and is connected with it by welding at the places at 5 and 6. In a similar manner the crank pin 2 is fixed in the other crank. Now the two halves thus prepared are assembled and welded together at 7. Finally the ends of the pins or shaft are connected by welding with the other half of the cranks at 8 and 9, respectively.

In this manner the crankshaft as a whole is produced, to be then annealed in order to remove all internal stresses, whereupon it is machined in the usual manner.

This manner of producing crankshafts can also be applied to the production of crankshafts which can be taken apart and reassembled, such as the crankshaft with toothed ends invented by the applicant.

Fig. 3 illustrates a shaft of this latter kind constructed in accordance with the present invention. The cranks are designed exactly as described with reference to Figs. 1 and 2. The bearing pins 1 and 11 form separate pieces, being connected with the cranks by means of their toothed ends, 1 being the part of the shaft transmitting the driving force to the air propeller or the like. The pins 11 and 12, being toothed at both ends, form the bearing pins for the main and connecting rod bearings of the shaft. In hardened condition they may serve as sliding bearings or preferably as rolling bearings. The pins 11, 12 are connected with the cranks by means of bolts 13, which also form tubular bodies formed at both ends with screw thread of different pitch, so that only the difference of pitch becomes effective. Interiorly these bolts are formed with means, known as such, for introducing a socket wrench, being, for instance, formed with a slot, a square or hexagonal perforation or the like, indicated at 14, or with teeth, by means of which the pin can be fixed in place by screwing.

The different pitch of the screw threads enables the parts of the shaft to be compressed very firmly. Apart from that this connection is known to not require any separate locking means.

Since the toothed ends of the parts of the shaft must possess a certain width in order to be able to transmit forces and since pieces made of sheet metal lack such width, the inserts such as 10 are preferably made of considerably stronger material, for instance of thick-walled steel tube or of a solid rod. These parts are also formed with a corrugated surface, the corrugations being formed by drawing and not requiring any machining. In the case of smaller and lighter shafts the corrugations 3 need only be provided on the toothed end of the inserts 10, the other end being made smaller in diameter and with a smooth outer surface, as shown in Fig. 4. This construction enables me to weld the connections also in the case where the pins are spaced only a small distance from each other, i. e. with cranks of small radius.

As shown in Fig. 5, the inserts 10 may also be conical. In that case the aperture left in the inserts must at least allow the socket wrench to be introduced for the fixing of the connecting bolts 13.

Instead of welding also any other mode of connection of the parts may be used, for instance by beading their edges together either all around or, in the case of a connection by tenons and mortises or by dovetailing, by inserting the projecting parts.

Instead of sheet metal, as this term is commonly understood, I may also use pieces of some other kind which possess a predetermined wall thickness which corresponds to the wall thickness of the parts of the crankshafts to be produced therefrom, for instance cup-shaped or other hollow bodies produced in some manner other than by casting.

I wish it to be understood that I do not desire to be limited to the exact details of construction shown and described for obvious modifications will occur to a person skilled in the art.

I claim:

A crankshaft comprising in combination, a plurality of cranks formed with openings, a tubular member extending between and connecting adjacent cranks, corrugated crank wall portions surrounding said openings, corrugated end portions provided on said tubular member and inserted in said openings so as to interlock with said corrugated crank wall portions, and welding seams firmly uniting said interlocking portions into integral structural parts, said corrugations serving to extend the length of said welding seams.

HELLMUTH HIRTH.